(12) United States Patent
Mel

(10) Patent No.: US 6,561,578 B1
(45) Date of Patent: May 13, 2003

(54) SEAT FOR BICYCLES

(76) Inventor: Jerome Mel, 1627 Boyd, Santa Ana, CA (US) 92705

( * ) Notice: Subject to any disclaimer, the term of this patent is extended or adjusted under 35 U.S.C. 154(b) by 0 days.

(21) Appl. No.: 09/823,128

(22) Filed: Mar. 30, 2001

(51) Int. Cl.[7] .................................................. B60N 2/38
(52) U.S. Cl. .................................................. 297/195.1
(58) Field of Search .................... 297/195.1, 195.13, 297/197, 215.13, 215.16

(56) References Cited

U.S. PATENT DOCUMENTS

| | | | | |
|---|---|---|---|---|
| 2,303,567 A | * | 12/1942 | McWhorter et al. | 297/195.1 X |
| 4,367,896 A | * | 1/1983 | Nieddu | 297/195.1 |
| 4,387,925 A | * | 6/1983 | Barker et al. | 297/195.13 X |
| 5,362,126 A | * | 11/1994 | Bontrager | 297/195.1 |
| 5,568,958 A | * | 10/1996 | Chen | 297/195.1 X |
| 5,664,829 A | * | 9/1997 | Thomson et al. | 297/195.1 X |
| 5,921,624 A | * | 7/1999 | Wu | 297/195.1 X |
| 5,921,625 A | * | 7/1999 | Muser | 297/215.15 |
| 6,039,394 A | * | 3/2000 | Chen | 297/195.1 |
| 6,039,396 A | * | 3/2000 | Muser | 297/214 |

* cited by examiner

*Primary Examiner*—Peter R. Brown
*Assistant Examiner*—Stephen Vu
(74) *Attorney, Agent, or Firm*—Edgar W. Averill, Jr.

(57) ABSTRACT

A seat for racing bicycles which is mounted on the seat post by a longitudinally extending rail of lightweight material, preferably of T cross section, formed integrally with the seat.

6 Claims, 3 Drawing Sheets

SEAT FOR BICYCLES

FIELD OF THE INVENTION

This invention relates to bicycle seats, and more particularly to an improved mounting system for lightweight bicycle seats.

BACKGROUND OF THE INVENTION

Weight is an extremely important factor in the design of lightweight bicycles, with even minute weight savings being prized by competitors in that sport. In essentially all bicycles, the seat is conventionally attached to the seat post by two generally parallel metal bars or rods running longitudinally of the seat and spaced from its underside. These bars are engaged and held in place by appropriate mounting hardware associated with the seat post.

Because of the weight factor and the need for strength, bicycle seats are typically sold with one of three kinds of bars: steel, chromalloy, or titanium. In ascending order, these materials are lighter but more expensive. Nevertheless, many riders are willing to bear the high cost of titanium in order to minimize the weight of the seat assembly.

A mechanical disadvantage of the conventional seat mounting is the fact that the bars tend to bend in use, so that the seat eventually goes out of alignment. Also, the attachment brackets for the bars interfere with the aerodynamic flow of air under the seat.

It would therefor be desirable to provide a seat mounting which is very light yet sturdy, inexpensive, aerodynamic and easy to mount.

SUMMARY OF THE INVENTION

The present invention provides a seat mounting with the above-identified desirable qualities by forming the seat mounting integrally with the seat itself. The inventive mounting includes a preferably T-shaped or T-beam rail that protrudes perpendicularly from the underside of the seat and extends longitudinally thereof. Like the seat itself, the rail of this invention is formed of nylon impregnated with carbon fiber. This material rivals the strength of titanium but is still lighter, yet less expensive and easily moldable into an aerodynamic shape that easily slides into a mounting bracket on the seat post.

DESCRIPTION OF THE PREFERRED EMBODIMENT

Figure 1:
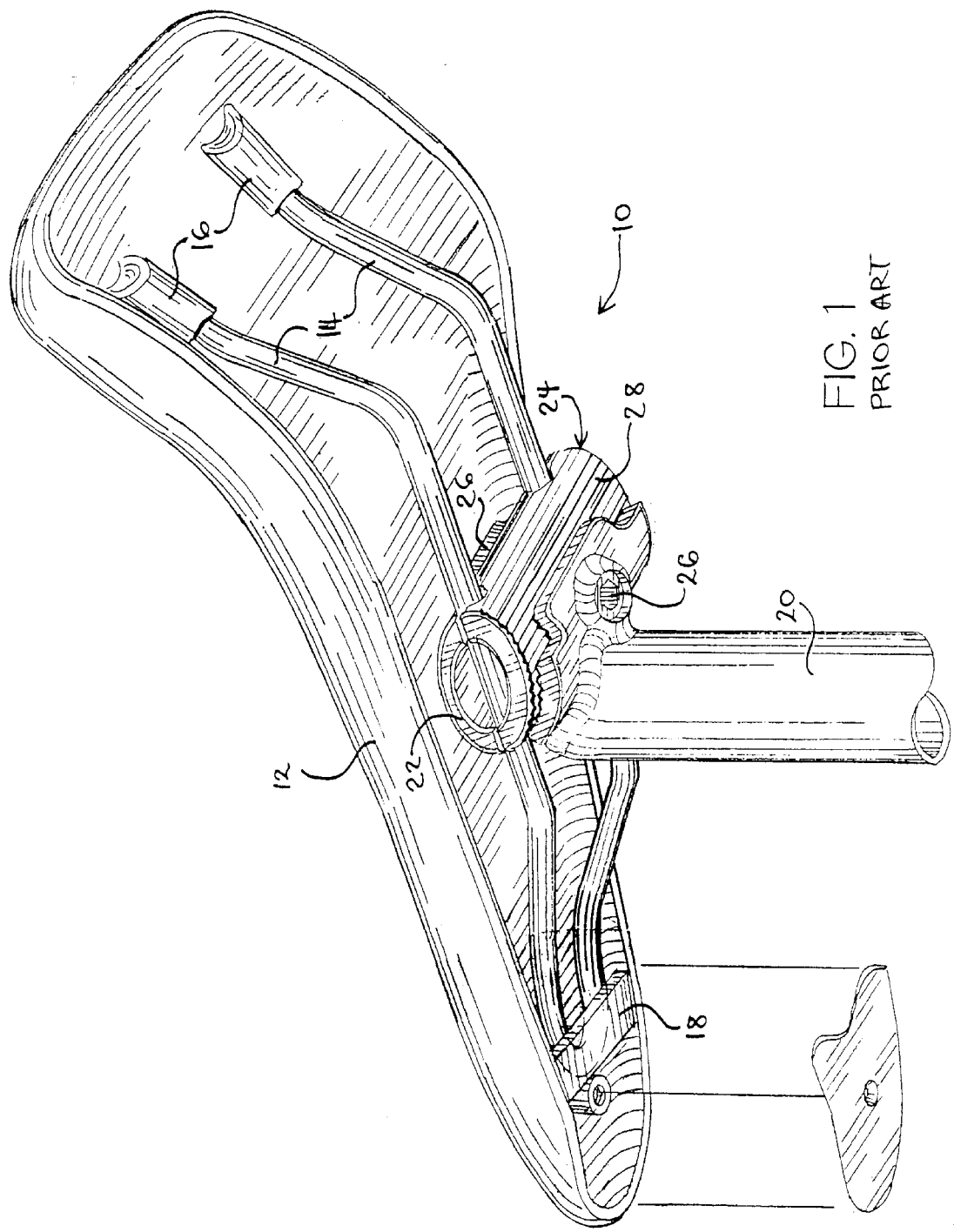
FIG. 1 is a perspective view showing the conventional way of mounting a seat on a bicycle seat post.

FIG. 1 illustrates the currently conventional seat mounting 10 upon which the present invention is intended to improve. On the underside of the seat 12, a pair of bars 14 are secured in rear brackets 16 and a front bracket 18. The bars 14 extend generally longitudinally of the seat 12. The seat 10 is conventionally secured to the seat post 20 by a three-piece mechanism 22, 24, 26. The bars 14 are clamped between a top member 22 and a bottom member 24. The bottom member 24 has an arcuate serrated surface on its underside which engages a corresponding arcuate serrated surface 28 on the top of the seat post 20 to allow adjustment of the angle between the post 20 and the seat 10. The seat 10 is fixed in position by assembling the top member 22 and bottom member 24 around the bars 14, and then tightening the bolt-and-nut element 26.

FIGS. 2–5 illustrate, by contrast, the seat mount 30 of this invention. The seat 32 is constructed of a lightweight nylon and carbon fiber material that is very strong and readily moldable. A mounting rail 34 is formed integrally with the seat 32 and extends vertically downward from the seat 32. In a preferred embodiment of the invention, the mounting rail 34 has a T-shaped cross section best illustrated in FIG. 4.

The rail 34 cooperates with a guide 38 secured to the seat post 40, into which it can be readily slid in a single motion. Guide 38 consists of channel plates 46 and 48. When inserted into the guide 38, the rail 34 is. readily secured by tightening the nuts 35 on the bolts 52. The T cross-section of the rail 34 firmly anchors the rail 34 in guide 38 (FIG. 4) formed by the channel plates 46, 48 which are adjustably supported by the arcuate seat post head 42.

Figure 2:
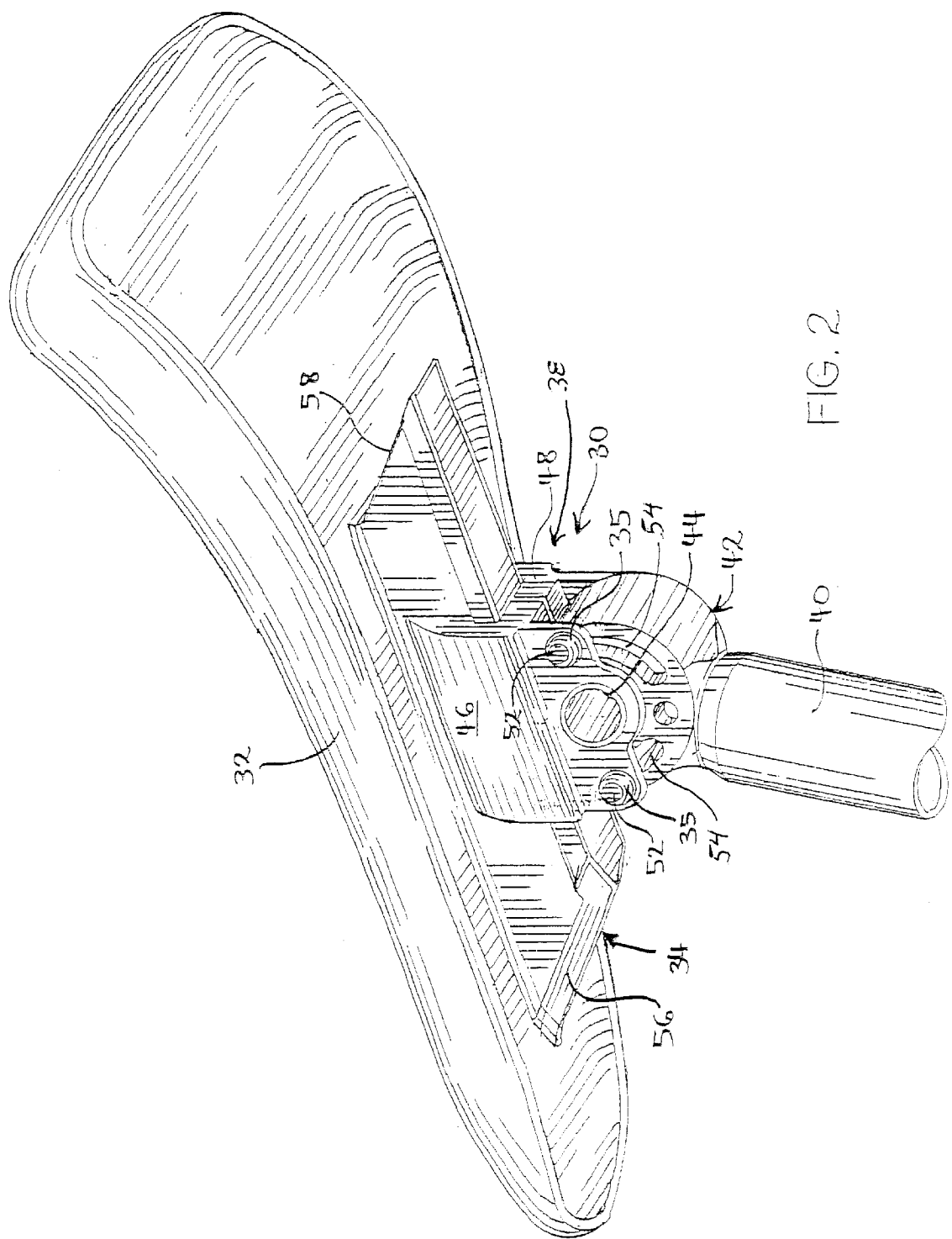
FIG. 2 is a similar perspective view but showing the mounting of this invention.
Figure 3:
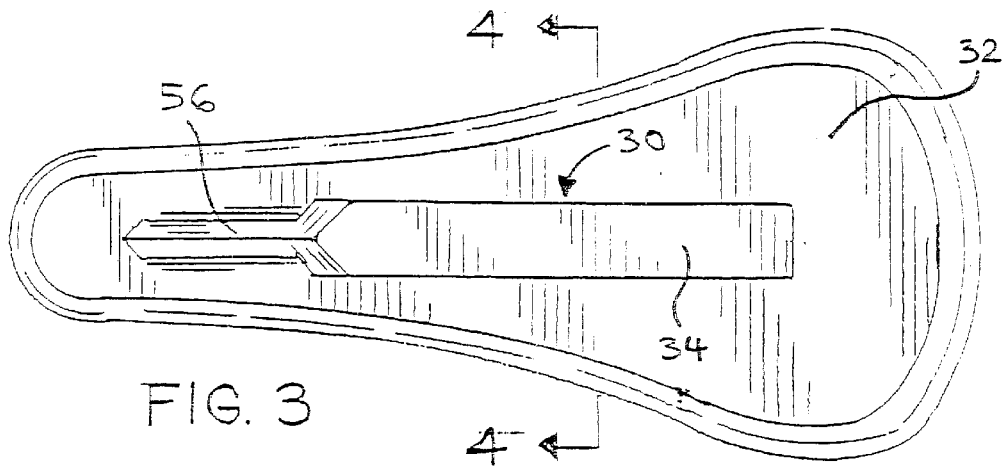
FIG. 3 is an underside view of this invention.
Figure 4:
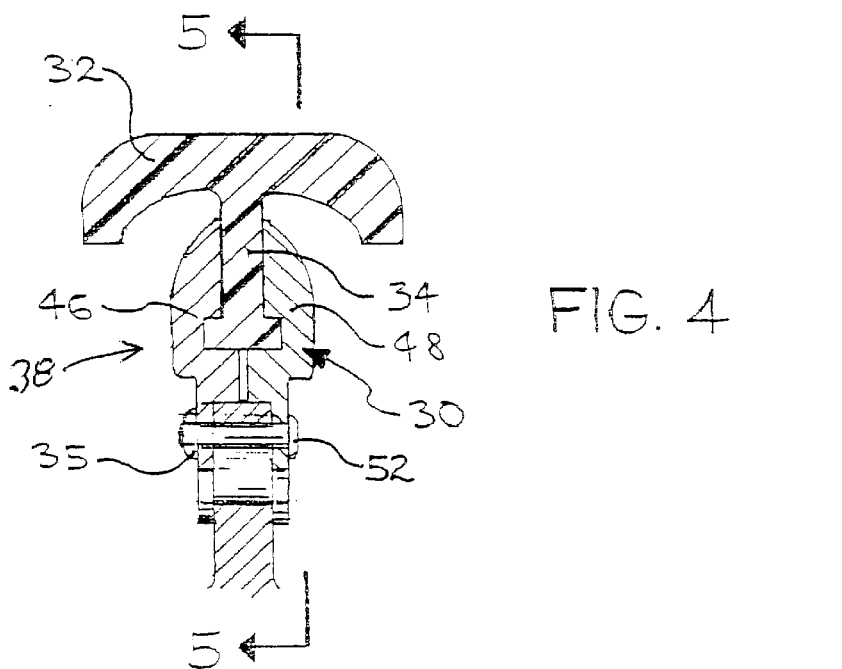
FIG. 4 is a vertical section along line 4—4 of FIG. 3.
Figure 5:
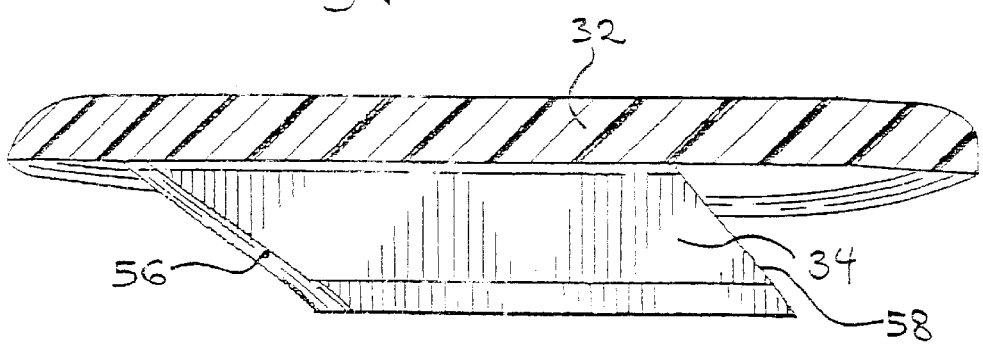
FIG. 5 is a vertical section along line 5—5 of FIG. 3.

The inventive mount 30 is particularly advantageous when combined with the seat post 40 of FIG. 2. The seat post 40 includes an adjustable head 42 which is rotatable about a shaft 44, within the limits of slots 54, for seat angle adjustment. The head 42 in turn supports guide 38 which includes a pair of channel plates 46, 48 which together form a guide or channel 38 into which the rail 34 can be slid, and in which the rail 34 is clamped by clamping bolts 52. As is evident from FIG. 2 of the drawings, the guide 36 can be slid anywhere along the rail 34 so that a guide attachment length exists along the entire length of rail 34.

It will be noted that the channel plates 46, 48 are of a shape that allows them to be manufactured as inexpensive and lightweight extrusions that need only be cut and drilled. Because the clamping bolts 52 moving in the adjustment slots 54 hold the channel plates 46, 48 in parallel relationship to each other and at the same angle with respect to the post 40, the guide 38 will always be ready to quickly receive the rail 34 without the need to move any parts of the head 42. At the same time, the inventive mount 30 dispenses with the need for the machined top member 22 and bottom member 24 of the prior art.

The inclined faces 56, 58 of the rail 34 used in a preferred embodiment of the invention facilitate insertion of the rail 34 into the guide 38, and contribute to the aerodynamic properties of the mount 30. It will thus be seen that the integral construction of the seat 32 and the rail 34 is highly advantageous in that it provides a seat mounting that is light, sturdy, aerodynamic, economical, and easy and quick to mount.

It will also be understood that the described embodiment is only exemplary, and that the invention can be modified, within the ambit of the claims, to suit various circumstances and environments.

I claim:

1. A bicycle seat, comprising:
   a) a substantially horizontally extending seat portion; and
   b) a rail depending from an underside of said seat portion, said rail having a guide attachment length which is longitudinally adjustably attachable to a guide affixable to a seat post of a bicycle;
   c) said rail extending substantially longitudinally of said seat and having a substantially planar vertically extending portion affixed along said length to said underside of said seat portion; and said seat post supporting said guide having a pair of parallel vertically extending plates, which together form a channel of a shape complimentary to the shape of said rail, said plates securing said rail to said post when pressed toward each other.

2. The seat of claim 1, in which said rail has a T-shape, wherein said planar vertically extending portion being a stem of the T-shaped rail.

3. The seat of claim 1, in which said rail is integrally formed with said seat.

4. The seat of claim 1, in which said rail has a forward end and the forward end of said rail is inclined to form an aerodynamic surface.

5. The seat of claim 1, in which said seat and rail are formed of nylon impregnated with carbon fibers.

6. The seat of claim 1, further comprising a seat post supporting a guide having a pair of parallel vertically extending plates which together form a channel of a shape complementary to the shape of said rail, said plates securing said rail to said post when pressed toward each other.

* * * * *